UNITED STATES PATENT OFFICE.

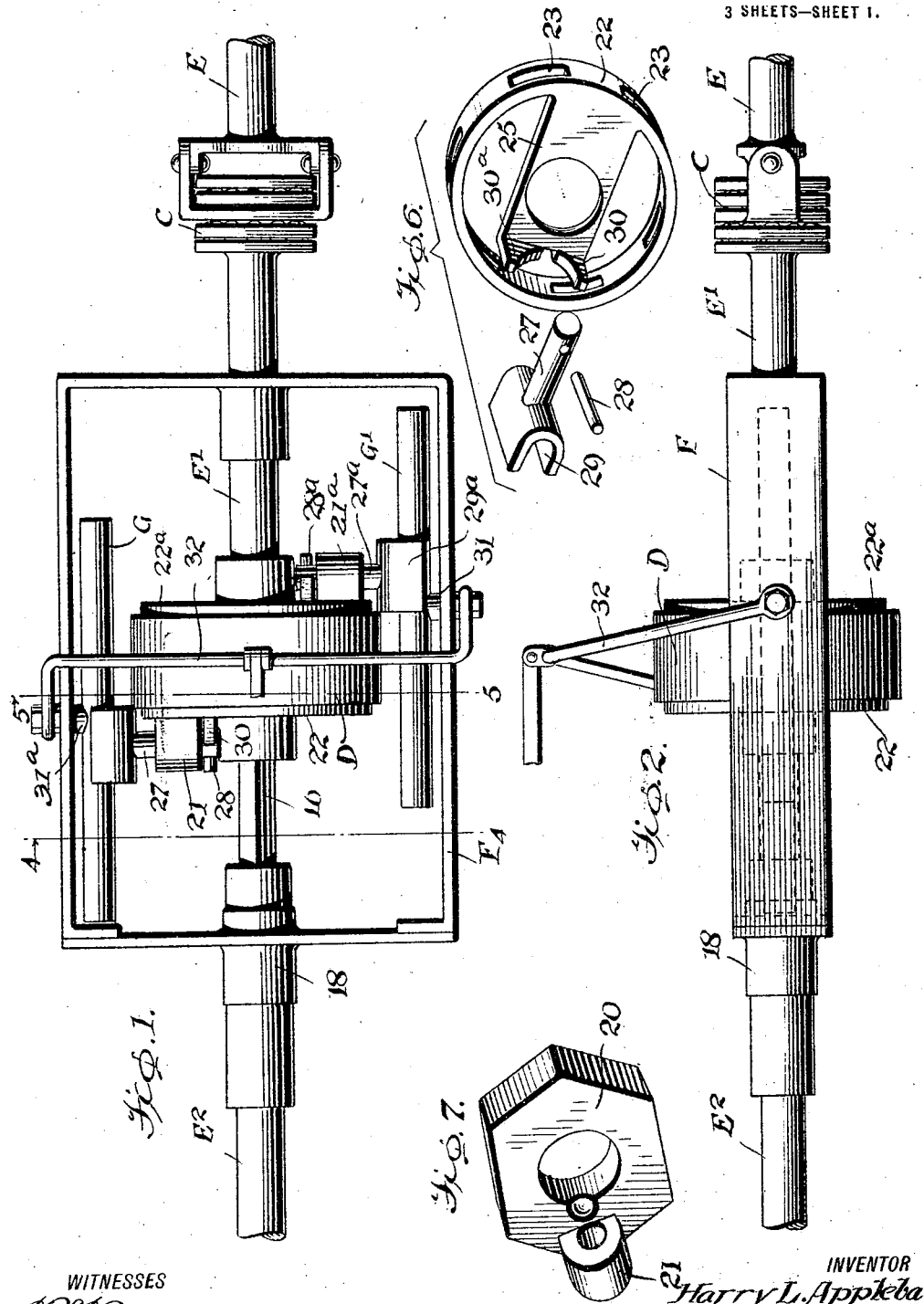

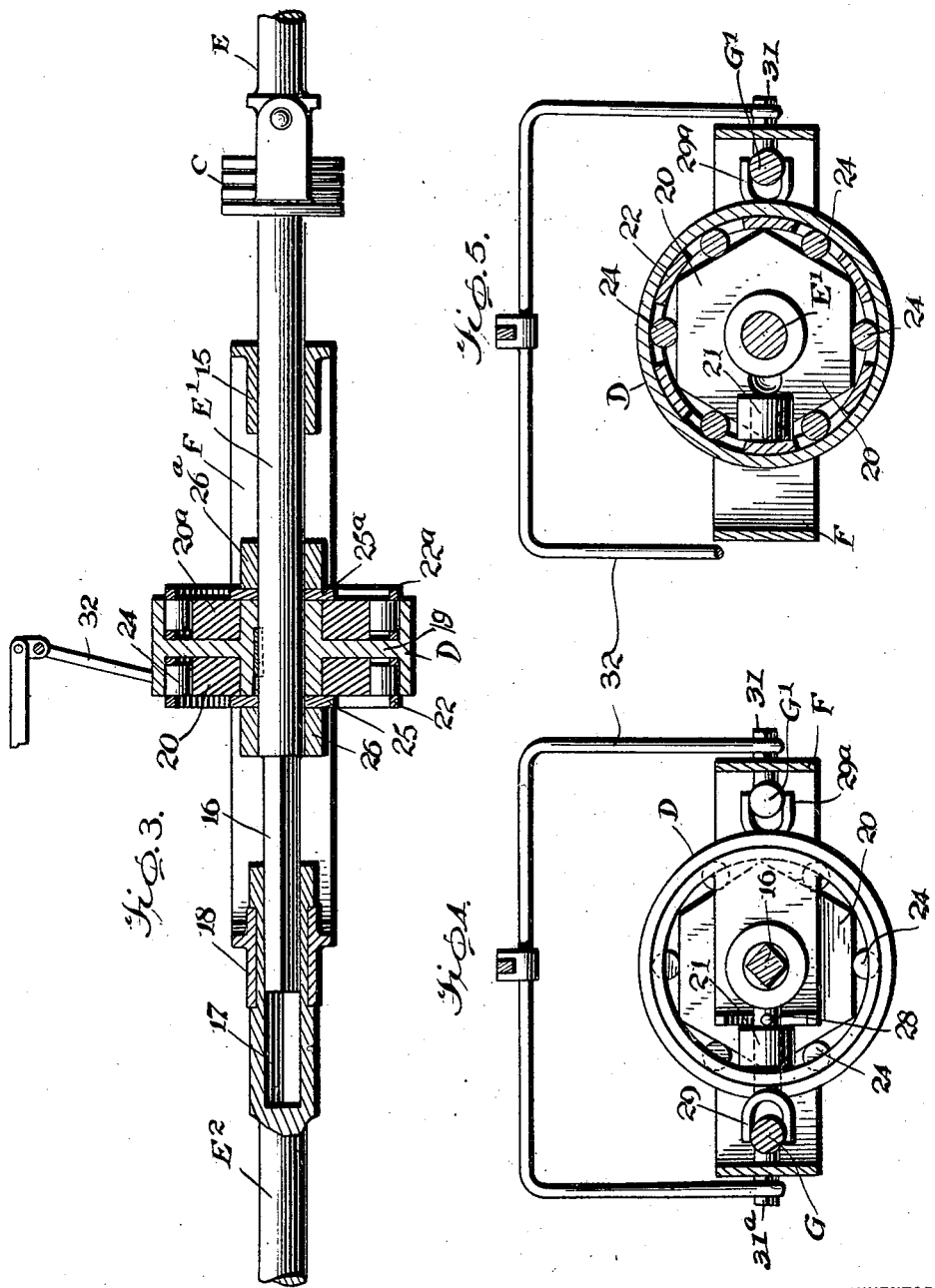

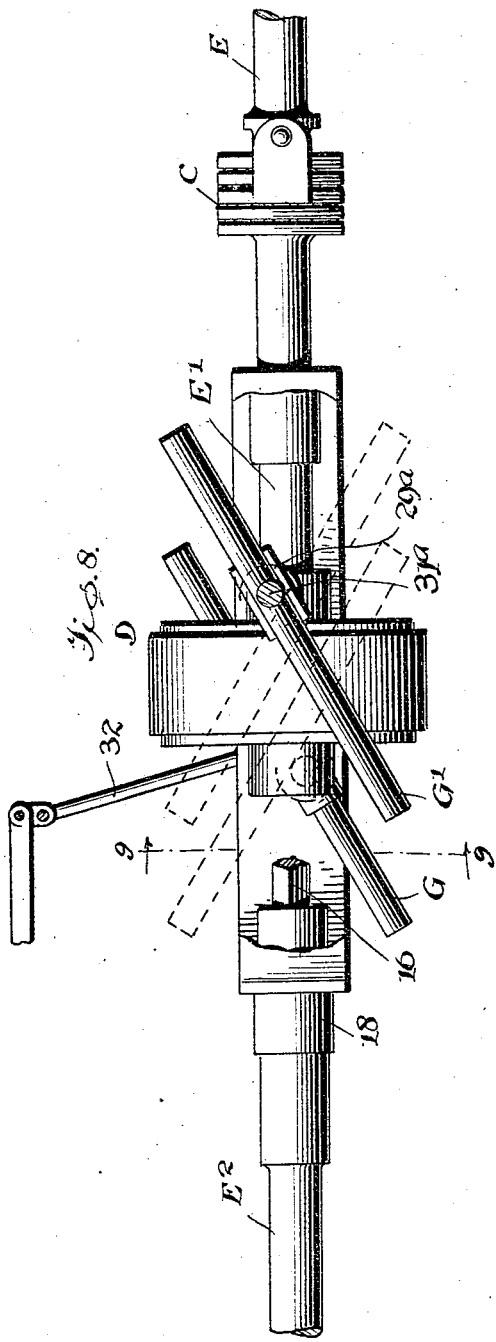
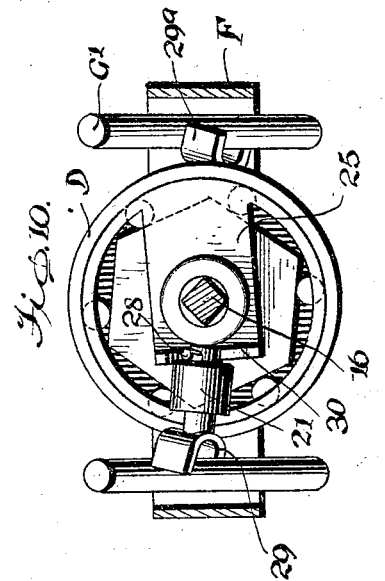
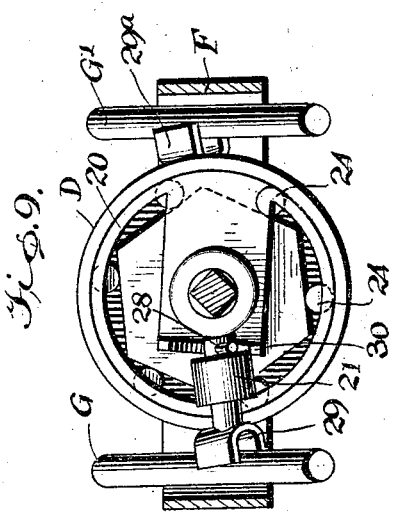

HARRY L. APPLEBAUM, OF DENVER, COLORADO.

TRANSMISSION MECHANISM.

1,413,563.

Specification of Letters Patent.  Patented Apr. 25, 1922.

Application filed February 26, 1921. Serial No. 448,172.

*To all whom it may concern:*

Be it known that I, HARRY L. APPLEBAUM, a citizen of the United States, and a resident of Denver, in the county of Denver and State of Colorado, have invented certain new and useful Improvements in Transmission Mechanism, of which the following is a specification.

My invention relates to power transmission mechanism, and the purpose of my invention is the provision of a transmission mechanism by means of which the ratio of rotational speed in either direction between driving and driven elements can be gradually varied to a selected degree; my invention being of simple, durable and efficient construction and capable of transmitting any and all speeds.

I will describe one form of transmission mechanism embodying my invention and will then point out the novel features thereof in claims.

In the accompanying drawings:

Figure 1 is a view showing in top plan one form of transmission mechanism embodying my invention.

Figure 2 is a view showing in side elevation the mechanism shown in Figure 1.

Figure 3 is a view showing in longitudinal section the mechanism shown in the preceding views.

Figures 4 and 5 are vertical sectional views taken on the lines 4—4 and 5—5, respectively, of Figure 1.

Figure 6 is a view showing certain parts of the clutch devices embodied in the mechanism shown in the preceding views.

Figure 7 is a view showing one of the cams employed in the clutch devices.

Figure 8 is a view similar to Figure 2 with part of the frame broken away and the mechanism in one extreme position.

Figure 9 is a vertical sectional view taken substantially on the line 9—9 of Figure 8.

Figure 10 is a view similar to Figure 9 showing the mechanism in the other extreme position as indicated in dotted lines in Figure 8.

Similar reference characters refer to similar parts in each of the several views.

Referring specifically to the drawings and particularly to Figures 1 and 2, my invention in its present embodiment comprises a reciprocating driving element designated at E which is adapted to be reciprocated by connecting it directly to the crank shaft of an engine through a pitman or other suitable means (not shown), such element being connected to a second driving element E' through the medium of a connection designated generally at C which is constructed to permit of rotation of the element E' while being reciprocated by the element E. The element E' is journaled in a bearing 15 formed in a frame F and is provided at one end with a square portion 16 which is slidably fitted in a correspondingly shaped socket 17 journaled in a bearing 18 of the frame F and formed on one end of a driven element $E^2$, all as clearly shown in Figure 3. By means of this connection, the driving element E' is free to reciprocate under the action of the element E but when rotated imparts a corresponding movement to the driven element $E^2$ which movement may occur during the reciprocation of the driving element.

Keyed to the driving element E' at a point within the frame F is a drum D which is divided transversely into two compartments by means of a partition 19. Within each of these compartments are arranged intermittent clutch devices which are identical in construction so that a description of one will suffice for both. Each clutch device, in the present instance, comprises a polygonal cam 20 or $20^a$ which, as shown in Figure 7, is provided axially thereof with an opening to loosely receive the driving element E', while upon its outer face a bearing 21 is formed for a purpose which will be hereinafter described. Each clutch device also includes a cage 22 or $22^a$ of annular form and provided at regular spaced intervals with slots 23 which form pockets for the reception of clutch members 24, as clearly shown in Figures 3 and 5. The clutch members 24 may be in the form of balls, rollers or the like, I having in the present instance shown rollers which are of a length to permit their free movement longitudinally of the slots 23 and of a diameter which appreciably exceeds the thickness of the perimeter of the cage 22 or $22^a$. As illustrated to advantage in Figure 6, each cage 22 or $22^a$ is provided with a diametrically extending arm 25 or $25^a$ which is formed with a suitable opening to loosely receive the driving element E' and which in applied position, as shown in Figure 3, is interposed between the hub of the drum D and collars 26 or 26ª fixed to the driving element E' so as to lock the arm and consequently the drum against longitudinal movement upon the driving element. In the applied position of the cages 22 and 22ª, they are interposed between the cams 20 and 20ª and the inner periphery of the drum D, with the several clutch members 24 confined within the pockets 23 and having rolling contact with the faces of the cams and the inner periphery of the drum. Each clutch device normally occupies what is termed a neutral position wherein it is ineffective to rotate the drum D, this position of the clutch being shown to advantage in Figure 5 wherein it will be seen that the cage 22 or 22ª occupies a position in which the clutch members 24 are disposed medially of the ends of the facets of the cam 20 or 20ª so that such members can freely rotate without having a clutching action upon the inner periphery of the drum. However, when the cage 22 or 22ª is shifted circumferentially in one direction or the other, the clutch members 24 are moved to one end or the other of the facets of the cam so that when the cam is rotated they will be locked against rotation and thereby effect an operative connection between the cam and drum so that the latter will rotate with the former. When the cage 22 or 22ª is shifted from the neutral position as shown in Figure 5 to one extreme position as shown in Figure 9, rotation of the cam 20 in a counterclockwise direction will effect a corresponding movement of the drum D. Conversely, when the cage 22 is shifted to the other extreme position as shown in Figure 10, rotation of the cam 20 in a clockwise direction will effect a corresponding movement of the drum D. It will thus be seen that according as the cage 22 or 22ª is shifted in one direction or the other the cam 20 or 20ª when rotated will effect rotation of the drum in one direction or the other. Should the cam 20 be rotated in the same direction in which the cage 22 has been shifted, the clutch members 24 will move to neutral position thus releasing the drum from the cam and rendering such movement of the cam ineffective to move the drum. It will therefore be seen that should oscillatory movement be imparted to the cam 20 when the cage 22 is in one of its extreme positions a step by step rotation of the drum is effected.

From the foregoing operation of one clutch device it will be clear that should the cages 22 and 22ª be shifted to occupy opposite extreme positions and the cams 20 and 20ª oscillated so that they move in opposite directions, first one clutch device and then the other will operate to effect a continuous rotation of the drum D, and by shifting the cages 22 and 22ª so as to occupy the other extreme position, the directional rotation of the drum can be reversed.

To effect shifting of the cages from neutral position to either extreme position and returning the same again to neutral position, and to effect oscillatory movement of the cams 20 and 20ª, I provide in the present instance a pair of stub shafts 27 and 27ª which are journaled in the bearings 21 and 21ª of the cams 20 and 20ª. As illustrated to advantage in Figure 6 each stub shaft 27 or 27ª is provided at its inner end with a pin 28 or 28ª and at its outer end with a substantially U-shaped yoke 29 or 29ª. By rotating the stub shaft 27 or 27ª the pin 28 or 28ª is moved to engage either of a pair of arcuate cams 30 or 30ª formed on and disposed at right angles to the arm 25 or 25ª. When the pin occupies a horizontal position as shown in Figure 1, it is out of engagement with either of the cams 30, but when rotated in either direction it engages one or the other of the cams 30 and thus effects a circumferential shifting of the cage about the driving element E' as a center to cause such cage to occupy either of its extreme positions according as the pin is rotated in one direction or the other. It is to be particularly noted that because of the particular contour of the cams 30 or 30ª the pin 28 or 28ª when rotated from neutral position will effect an instantaneous shifting of the cage and to thereby cause the instantaneous operation of the clutch device which is necessary to the successful operation of the mechanism. The yoke 29 or 29ª has sliding engagement with a guide rod G or G' mounted for rocking movement by an extension 31 or 31ª which is journaled in the frame F. The extensions 31 and 31ª are operatively connected to each other to effect simultaneous movement of the guide rods G and G' by a connecting yoke 32, and to which latter suitable means (not shown) is adapted to be connected for manually actuating the yoke from a remote point. From this arrangement it will be seen that with the yoke 32 in vertical position the guide rods G and G' occupy a horizontal position and that when the yoke is moved forwardly or rearwardly from the vertical position the guide rods will simultaneously swing about the extensions 31 and 31ª as centers to occupy various inclined positions. In the extreme forward position of the yoke 32 as shown in Figure 8, the guide rods G and G' occupy their extreme inclined position in one direction, and when the yoke is moved to the other extreme position as shown in dotted lines in Figure 8, the guide rods will occupy the position shown in dotted lines.

As previously described, the yokes 29 and 29ª are slidably fitted upon the rods G and G', and in such manner that they at all times maintain a sliding engagement with the rods irrespective of the position of the latter so that it will be seen that when the rods are inclined, as shown in Figure 8, the yokes will effect a partial rotation of the shafts 27 and 27$^a$ to effect a shifting of the cages 22 and 22$^a$ with the pins 28 and 28$^a$ engaging the cams 30 and 30$^a$. It is to be further noted that as long as the guide rods maintain inclined positions the cages will remain in shifted position but as soon as the rods return to horizontal position the cages are simultaneously returned to neutral position.

From the foregoing description, the operation of the transmission mechanism may be briefly described as follows:

When the mechanism is in the normal position as shown in Figures 1 and 2 and the driving element E' is being reciprocated by the element E, the cages 22 and 22$^a$ being in neutral position, the clutch devices are ineffective to rotate the drum D so that the driving element E' does not rotate and therefore the driven element E$^2$ remains inactive. However, when the guide rods G and G' are moved to inclined position, an instantaneous shifting of the cages 22 and 22$^a$ to one of their extreme positions is effected, and under the reciprocating action of the driving element E' oscillation of the cams 20 and 20$^a$ is alternately effected by virtue of the lateral movement imparted to the stub shafts 27 and 27$^a$ through the medium of the yokes 29 and 29$^a$ engaging the guide rods G and G'. It will be clear that the degree of oscillation of the cams 20 and 20$^a$ is directly dependent upon the position of the guide rods so that if the latter are moved to their greatest inclination, the maximum lateral movement of the stub shaft is effected to cause the greatest degree of oscillation of the cams. This naturally effects a rotation of the drum at its maximum speed, and it is to be understood that by lessening the inclination of the rods the speed of the drum can be correspondingly decreased. When the guide rods G and G' are moved to the position shown in dash lines shown in Figure 8 or as shown in solid lines in Figure 10, a reverse rotation of the drum D and consequently the driven element E$^2$ is effected, and by varying the inclination of the rods between this extreme position and the neutral position, the rotational speed of the driven element E$^2$ can be likewise varied. It will thus be seen that according as the guide rods are moved from the horizontal or neutral position to either of its inclined or extreme positions, the rotational speed of the driven element E$^2$ is gradually increased and that the direction of rotation of the driven element E$^2$ can be varied according as the rods are moved in one direction or the other from neutral position.

Although I have herein shown and described only one form of transmission mechanism embodying my invention, it is to be understood that various changes and modifications may be made herein without departing from the spirit of the invention and the spirit and scope of the appended claims.

What I claim is:

1. A transmission mechanism comprising, a frame, a rotary driven shaft journaled in the frame, a reciprocating and rotary driving shaft journaled in the frame and operatively connected to the driven shaft, a drum fixed to the driving shaft, polygonal cams loosely fitted on the driving shaft at opposite sides of the drum, cages interposed between the cams and drum, clutch members movably mounted in the cages and adapted to be engaged by said drum and cams, guide rods rockingly supported upon the frame, stub shafts on the cams, cams carried by the cages, pins on said shafts adapted to engage said cage cams, and yokes on the stub shafts and slidably fitted on said guide rods.

2. A transmission mechanism comprising, a rotary and reciprocating driving element, a rotary driven element operatively connected to the driving element, a drum fixed to the driving element, cams loosely fitted on the driving element at opposite sides of said drum and disposed within the drum, cages interposed between the cams and drum, two sets of clutch members movably mounted in the cages and adapted to contact with said cams and drum, adjustable guide rods sustained adjacent the drum, and means associated with said cages and guide rods for actuating said cams to cause said clutch members to alternately engage said drum and to effect a step by step rotation of the drum under the action of the reciprocating driving element.

3. A transmission mechanism comprising, a rotary and reciprocating driving element, a rotary driven element operatively connected to the driving element for rotation therewith, a drum fixed to the driving element, intermittent clutch devices associated with the drum for continuously rotating the drum in one direction or the other, and means operable by the reprocating movement of the driving element for actuating the clutch devices.

4. A transmission mechanism comprising, a rotary and reciprocating driving element, a rotary driven element operatively connected to the driving element for rotation therewith, a drum fixed to the driving element, intermittent clutch devices associated with the drum for continuously rotating the drum in one direction or the other, and means operable by the reciprocating movement of the driving element for actuating the clutch devices, said means being adjustable to increase or decrease the rotational speed of said drum.

5. A transmission mechanism comprising, a rotary and reciprocating driving element, a rotary driven element operatively connected to the driving element for rotation therewith, a drum fixed to the driving element, intermittent clutch devices associated with the drum for continuously rotating the drum in one direction or the other, and means operable by the reciprocating movement of the driving element for actuating the clutch devices, said means being adjustable to cause said clutch devices to increase or decrease the rotational speed of said drum in one direction or the other.

6. A transmission mechanism comprising, a rotary and reciprocating driving element, a rotary driven element operatively connected to the driving element for rotation therewith, a drum fixed to the driving element, two sets of clutch devices associated with the drum for effecting continuous rotation therewith in one direction or the other, and means operable by the reciprocating movement of the driving element for alternately actuating the sets of clutch devices in one direction or the other and at variable speeds comprising, cams on the clutch devices, pins engageable with the cams, yokes rotatably mounted on and movable with the clutch devices, and guide rods engageable with the yokes, said guide rods being stationary to effect bodily oscillation of the yokes and adjustable to increase or decrease the oscillatory movement of the yokes and to reverse the movement of the yokes.

7. A transmission mechanism comprising, a rotary and reciprocating driving element, a rotary driven element operatively connected to the driving element for rotation therewith, a drum fixed to the driving element, two clutch devices associated with the drum with each including a cage which is circumferentially movable to vary the clutching action of the devices with respect to the drum and in either direction to effect rotation of the drum in one direction or the other, means for acuating said clutch devices comprising, cams secured to the cages, yokes movable with the clutch devices, means engageable with said cams and operable by the movement of the yokes for circumferentially shifting the cages in one direction or the other, and relatively stationary guide rods engaged by the yokes, said guide rods being adjustable to vary the movement of the yokes and to actuate the yokes in a manner to operate the means for shifting the cages.

8. A transmission mechanism comprising, a rotary and reciprocating driving element, a rotary driven element operatively connected to the driving element for rotation therewith, intermittent clutch devices associated with the driving element and operable by reciprocation thereof, said devices being capable of occupying a neutral position in which the driving element is only reciprocated and two extreme positions in which the driving element is rotated in one direction or the other according as the clutch devices occupy one extreme position or the other, and manually operable means for moving the clutch devices to any of their several positions and to any position between the neutral and extreme positions whereby, the rotational speed of the driving element in either direction can be varied.

9. A transmission mechanism comprising, a rotary and reciprocating driving element, a rotary driven element operatively connected to the driving element for rotation therewith, a drum fixed to the driving element, intermittent clutch devices engageable with the drum, each of said devices comprising, a polygonal cam, a cage interposed between the drum and cam, and clutch members confined within the cage and engageable by said cam for operatively connecting the cam and drum, means for shifting the cage to cause said members to occupy different clutching positions comprising, stub shafts journaled on the cams, pins carried by the stub shafts, cams carried by the cages and engageable by said pins, and means operable by the reciprocating movement of the driving element for actuating said clutch devices, said means comprising yokes sustained on said stub shafts, and guide rods slidably receiving said yokes, said guide rods being adjustable to cause said yokes to move in different paths for the purpose described.

HARRY L. APPLEBAUM.